May 6, 1952  F. W. COFFING  2,595,450
RELEASING TYPE HOOK
Filed Nov. 21, 1949  2 SHEETS—SHEET 1
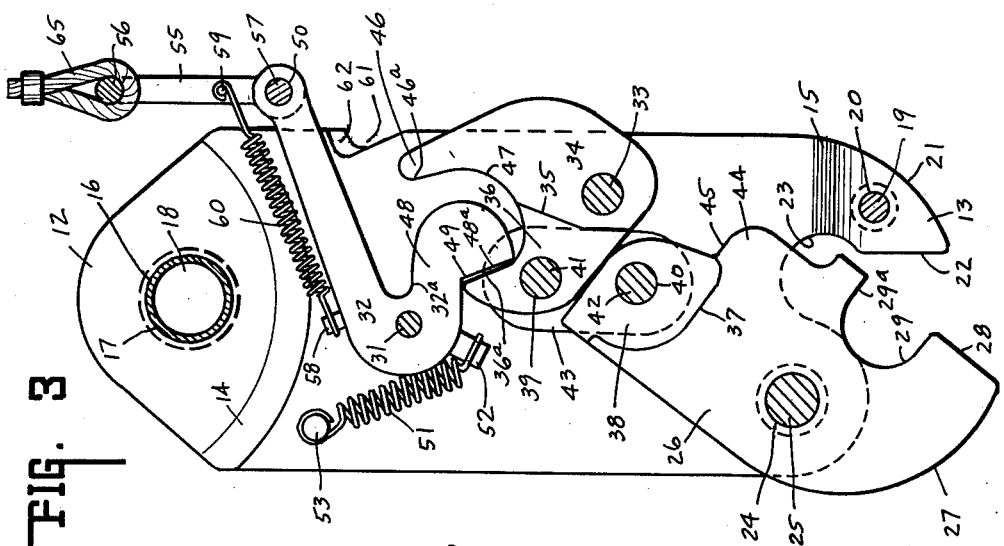
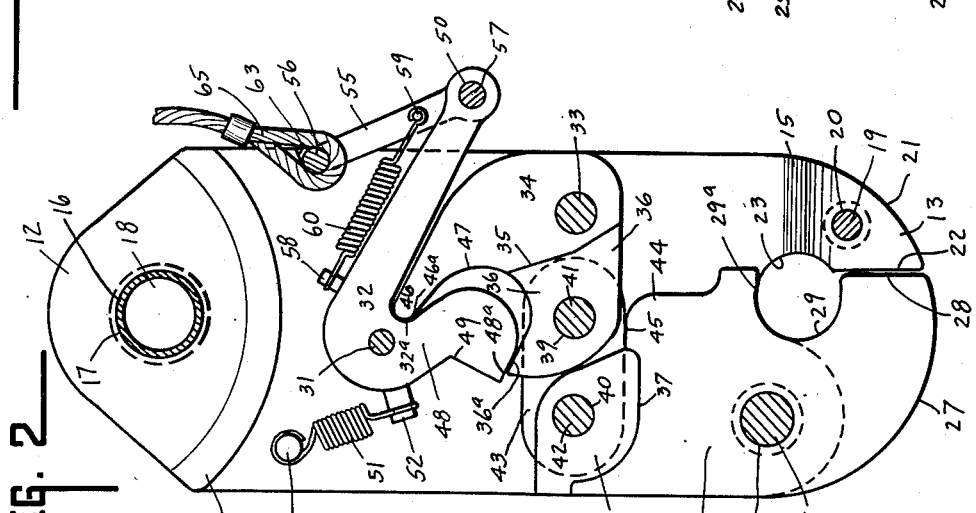
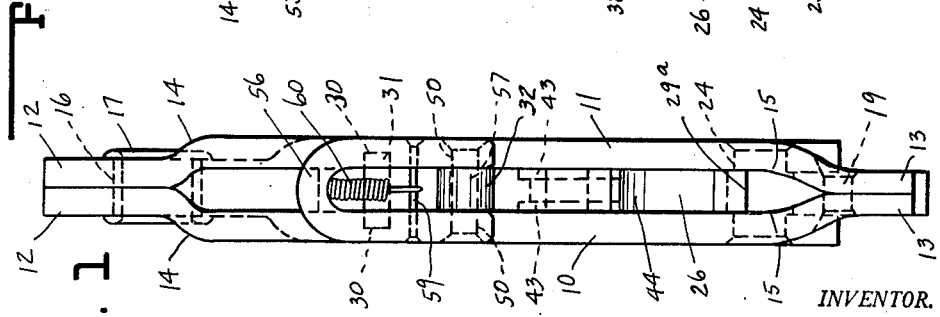
INVENTOR.
FREDRICK W. COFFING.
BY
Lockwood, Goldsmith & Galt,
ATTORNEYS.

May 6, 1952 F. W. COFFING 2,595,450
RELEASING TYPE HOOK
Filed Nov. 21, 1949 2 SHEETS—SHEET 2
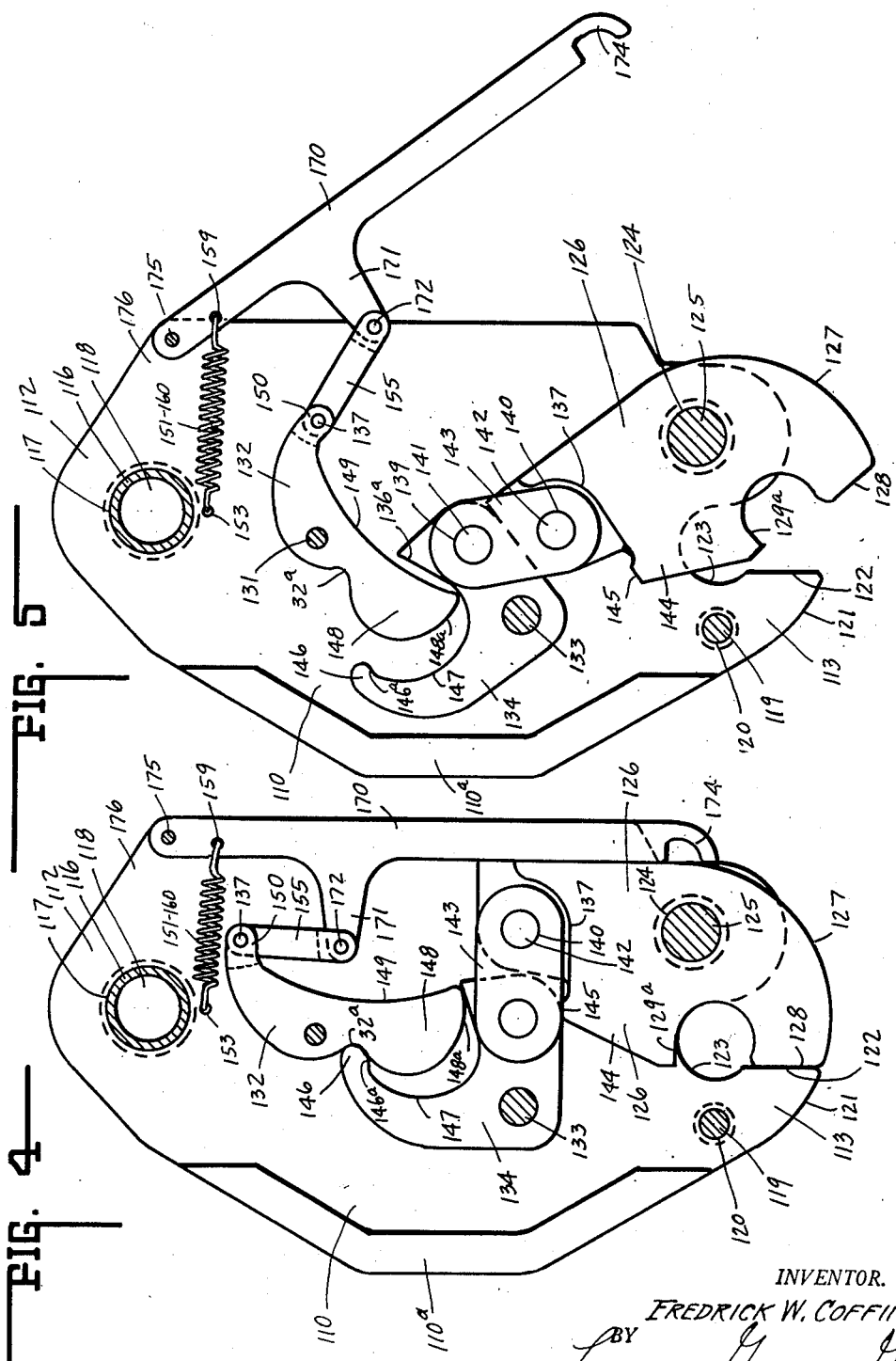
INVENTOR.
FREDRICK W. COFFING,
BY
Lockwood, Goldsmith Galt,
ATTORNEYS.

Patented May 6, 1952

2,595,450

UNITED STATES PATENT OFFICE 2,595,450

RELEASING TYPE HOOK

Fredrick W. Coffing, Danville, Ill., assignor to Coffing Hoist Company, Danville, Ill., a corporation Application November 21, 1949, Serial No. 128,512

16 Claims. (Cl. 294—83)

1

This invention relates to a drop-hook device.

One chief object of the present invention is to simplify the construction of a hook device of the aforesaid type and to insure against accidental actuation so that the load will not be released accidentally.

Another chief object of the present invention is to embody the basic invention in a housing wherein substantially all moving parts except the movable jaw and release member are enclosed, thereby permitting use in all types of weather and terrain without clogging, jamming, or the like.

The chief feature of the present invention resides in its simplicity of construction and the holding in of the release mechanism, which in turn is automatically releasable upon positive actuation for effecting hook opening with load applied.

A further feature of the invention resides in the concealing type of release member and immediately associated parts and the concealing type of housing embodied in one form of the invention.

It is to be understood that while the invention is designated a drop hook, it can and has been used as a horizontal and similar hooking connection.

Other objects and features of the invention will be set forth more fully hereinafter.

The full nature of the invention will be understood from the accompanying drawings and the following description and claims:

In the drawings Fig. 1 is an elevational view of an embodiment of the invention with parts in closed hook position and looking at the release side thereof.

Fig. 2 is a plan view of the same with the left hand housing member shown in Fig. 1 removed.

Fig. 3 is a view similar to Fig. 2 with parts in the released or open hook position.

Fig. 4 is a view similar to Fig. 2 and of a modified form of the invention; the hook being illustrated in closed position.

Fig. 5 is a similar view of the second form of the invention with parts shown in the open hook position.

In Fig. 1 of the drawings 10 indicates one housing member and 11 the other and complementary member. Each is elongated as shown and has opposite ends 12 and 13 laterally offset as at 14 and 15. Ends 12—12 and ends 13—13 abut.

Ends 12 include apertures 16 which if desired take a tubular rivet 17 that unites said ends 12—12 and provides an opening 18 for connection purposes. The ends 13—13 are secured together by rivet 19 or the like seated in registering holes 20 and having countersunk heads.

Note these ends, see Fig. 1, are medianly disposed relative to the central plane of the housing and ends 13, see Figs. 2 and 3, have curved exterior surfaces 21 and flat faces 22 and recessed portions 23. This is the fixed jaw structure.

In counter-bored registering holes 24 is counter sunk a rivet 25 that pivotally supports, between the housing members 10 and 11, the movable jaw member 26. The pivot and jaw may be integral if desired.

This jaw member includes curved end 27, flat face 28 and recess 29. As shown in Fig. 3 portion 29ª projects into the throat of the hook when open so that when engaged by a rod, ring, loop, clevis, etc., for holding purposes, the movable jaw 26 is tilted counter clockwise for hook closing and automatically locked. When so closed faces 22 and 28 abut as shown in Fig. 2, and recesses 23 and 29 form an anchoring hole disposed slightly eccentrically of anchoring aperture 18 see Fig. 2.

Each housing member is recessed at 30, see Fig. 1, to take an end of pivot member 31 that supports a lever 32 see Figs. 2 and 3. If desired this pin and lever may be integral. Another housing carried pivot 33 pivotally supports upon and within said housing, the lever member 34 having the sides reduced as at 35 to form the central portion 36 with aperture 39 therein taking pin 41.

The upper end of movable jaw 26 has its sides reduced at 37 to form the central portion 38. This central portion is apertured at 40 and pivot pin 42 therein is connected at opposite ends to links 43. These are connected to lever 34 at pin 41. The resulting linkage is of toggle type.

The movable jaw 26 includes the shoulder portion 44 providing face 45, which, see Fig. 2, is engaged by the side edges of the links 43 so that all centers of pins 42, 41 and 33 are transversely aligned relative to the longitudinal axis of the hook device. The linkage passes from the overcenter position (open hook) shown in Fig. 3 to the on center position (closed hook) shown in Fig. 2. It cannot pass over center beyond the on center position.

Lever member 34 includes tail portion 46 and an adjacent cut-out, recessed or relieved portion 47. Lever 32 is of bell crank type including an arm 48 that is cut-out, relieved or recessed as at 49. The other end of lever 32 terminates in eye portion 50 which projects beyond the hook housing at all times.

A spring 51 is suitably secured at one end to a projection 52 (may be a grooved bolt) carried by lever 32. Its other end is fixed at 53 to said housing. This anchorage may comprise a pin seated at opposite ends in recesses in the housing members or, if desired, may comprise an additional member for connecting the housings 10 and 11 together and against separation. The aforesaid may also apply to pivot 33.

Counter-clockwise movement of lever 32 causes arm 48 at 32ᵃ to engage lever arm 34 at tail portion 46 at 46ᵃ and to collapse the toggle linkage to the position shown in Fig. 3 to open the hook. Note that the arm 48 of lever 32 at 48ᵃ engages portion 36 of lever 34 at 36ᵃ and positively locks the linkage in aligned or on-center position. This lock is released when the lever 32 is tilted counter-clockwise, and such tilting, as aforesaid, first effects unlocking and then applies leverage at 32ᵃ—46ᵃ to break the dead center alignment of pins 42—41— and 43.

The eye portion 50 of lever 32 is straddled by arms 55 of a loop member 56 and the two members are pivotally connected together as at 57. Each member mounts a spring anchor 58 and 59 respectively to which opposite ends of spring 60 are attached.

The side edges of the housing members are notched, see Fig. 3, as at 61 providing inclined stop shoulders 62. The two opposite notches form a pocket to nest the free end 56 of the loop aforesaid. Said spring 60 normally tends to draw arms 55 into bearing engagement with stops 62, all as shown in Fig. 3. Note, see Fig. 1, these two shoulders substantially conform in outline to the adjacent portions of the loop and the central gap between the shoulders 62 provides clearance for the actuating member 65 carried by the loop 55. Thus spring 60 tends to hold the trip loop in safety position and the notches serve as a safety lock.

When member 65 is pulled parallel to the hook or slightly sidewardly (Figs. 2 and 3) to a parallel position, the loop is automatically released from the lock formation and continued pull tilts lever 32 counter clockwise to open the hook as previously described. Hook closing is effected as previously described.

Reference will now be had to Figs. 4 and 5, comparable to Figs. 2 and 3, wherein numerals of the one hundred series indicate like or similar parts designated by the primary series numerals in said Figs. 2 and 3.

This form is peculiarly applicable to logging and like use. In this industry operations occur in all kinds of weather and over all kinds of terrain. Hence the invention is of closed housing type so that dirt, snow, etc., will not collect and clog in the device.

Since the basic operation of this form is essentially the same as that illustrated in Figs. 1 to 3, reference to the form shown in Figs. 4 and 5 will be restricted to the departures from the first form. The first of these is the housing which is closed at 110ᵃ as shown. The opposite side, however, has no flange but is left open as before to accommodate the release mechanism and such open side now is closed by an arm 170 when the hook is closed, see Fig. 4, and as hereinafter pointed out.

A second departure resides in the use of but a single spring 151—160 instead of two springs 51 and 60. This spring is suitably anchored at one end at 153 to the housing and at its other end at 159 to release arm or lever 170. The latter is pivoted at 175 in the housing slot 176. As before the two sides of the housing at the ends extend inwardly towards each other as shown in Fig. 1 for example.

A third departure is found in the change of the shape of lever arm 132. This arm has reduced portion 150 which is pivotally connected at 137 to a link 155 that straddles lateral portion 171 of lever arm 170 and same are connected together at 172. Arm 170, pivoted at one end at 175 in the housing has its other end terminating in a hook portion 174.

When this arm is disposed as shown in Fig. 4, an angle and member can be interested between the housing and the hook 174 and the arm is pulled outwardly to the position shown in Fig. 5 or sufficiently to a previous position to "break the joint" at 141 and the load applied then opens the hook as before for load release.

When this embodiment is presented to the load as described previously, or vice versa, engagement of abutment 129ᵃ on movable jaw 126 closes the hook. This also effects tilting of release arm 170 to the position shown in Fig. 4, assisted by spring 151—160, in which said arm then in effect closes the open side of the housing. Thus as shown in Fig. 4, this closed device offers no chance for obstruction or entanglement to interfere with working of inside mechanism when dragged through the woods.

As stated previously, except for the foregoing departures, the two embodiments are essentially the same in principle and the basic operation and control of the movable jaw and linkage immediately associated therewith is also the same.

It is also to be noted that the movable jaw 27, see Figs. 2 and 3, is broadly L-shaped in outline and the stationary jaw 13 includes reentrant formation 23 so that when the jaws abut at 28—26 the load then carried by the closed hook is distributed between surfaces 29 and 23 of said jaws.

In like manner, see Figs. 4 and 5, the two jaws 113—127 as before, have identical conformations, and similarly function to divide the load therebetween.

While the invention has been illustrated and described in great detail in the drawings and foregoing description, the same is to be considered as illustrative and not restrictive in character.

The several embodiments described herein as well as others which will readily suggest themselves to persons skilled in this art, all are considered to be within the broad scope of the invention, reference being had to the appended claims.

The invention claimed is:

1. In a hook structure a stationary jaw, a second jaw effectively L-shaped in outline, the two jaws having engagement when the hook is closed, a housing in which the second jaw is pivoted near one end and to one side thereof opposite the fixed jaw carried by said housing, a bell crank lever pivoted intermediate the housing ends and to one side of the stationary jaw, a second bell crank lever pivoted in said housing remote from the second jaw and first lever pivotal axis and between the same, link means connecting the second jaw and first lever together, the two levers being oppositely disposed and each having the arms thereof disposed at acute angles to one another with adjacent ends having cam faces operatively interengaging and relatively movable for cam action therebetween to open the hook, and spring means normally constraining the second lever to hook closed position.

2. In a toggle linkage type hook device the combination of a pair of plate members of elongated character with spaced longitudinally disposed laterally offset ends adapted for operative abutment and connection together, one of said pair of abutting ends comprising a device anchorage and the other pair of said abutting and connected ends comprising a hook stationary jaw, a movable jaw member disposed beyond and pivotally supported by the plate members and juxtapositioned to the stationary jaw, a toggle type linkage having a pair of relatively fixed pivots carried by said plate members and connected to the movable jaw member and disposed beyond and operatively pivoted by said plate members, the side edges of the plate members having a latched receiving recess formed therein, a safety latch connected to said linkage and seating in said recess and means disposed between the plate members and connected thereto and the safety latch constraining said safety latch to recess seating position.

3. In a toggle linkage type hook device the combination of a pair of plate members of elongated character with spaced longitudinally disposed laterally offset ends adapted for operative abutment and connection together, one of said pair of abutting ends comprising a device anchorage and the other of said abutting and connected ends comprising a hook stationary jaw, a movable jaw member disposed between and pivotally supported by the plate members and juxtapositioned to the stationary jaw, a toggle type linkage comprising a pair of bell crank type levers each associated with a fixed pivot on said plate members and link means connecting the movable jaw member, a bell crank lever end cam follower connection between said levers and disposed between and operatively pivoted by said plate members and comprising means stationarily anchored to at least one of said members and connected to said cam follower to convey said cam follower in its sealed position.

4. A toggle linkage type hook device, the combination of a pair of plate members of elongated character with spaced, longitudinally disposed laterally offset ends adapted for operative abutment and connection together, one of said pair of abutting ends comprising a device anchorage and another of a pair of said abutting ends comprising a hook stationary jaw, a movable jaw member disposed between and pivotally supported by the plate members and juxtapositioned to the stationary jaw and a toggle type linkage comprising a pair of bell crank type levers each associated with a fixed shaft carried by said plate members and link means connecting the movable jaw member and one of said bell crank levers, a cam and follower connection between said levers and means constraining said two levers to engagement in said closed hook position.

5. In a toggle linkage type hook device, the combination of a pair of plate members of elongated character with spaced longitudinally disposed laterally offset ends adapted for operative abutment and connection together, one of said pair of abutting ends comprising a device anchorage and the other pair of said abutting and connected ends comprising a hook stationary jaw, a movable jaw member disposed between and pivotally supported by the plate members and juxtapositioned to the stationary jaw, and a toggle type linkage comprising a pair of bell crank type levers each associated with a fixed pivot carried by said plate members and link means connecting the movable jaw member with one of the bell crank levers and a cam and follower connection between said levers, the axis of one of said fixed pivots and the axes of the link pivotal connections being in alignment in closed hook position and constraining means stationarily anchored to at least one of said plate members and connected to said cam follower to constrain said cam follower in its seated position.

6. In a toggle linkage type hook device, the combination of a pair of plate members of elongated character with spaced longitudinally disposed laterally offset ends adapted for operative abutment and connection together, one of said pair of abutting ends comprising a device anchorage and the other pair of said abutting and connecting ends comprising a hook stationary jaw, a movable jaw disposed between and pivotally supported by the plate members and juxtapositioned to the stationary jaw, and a toggle type linkage comprising a pair of bell crank type levers each associated with a fixed pivot carried by said plate members and link means connecting the movable jaw member and one of said bell crank levers, a cam and follower connection between said levers, the axis of one of said fixed pivots and the axes link pivotal connections being in alignment in closed hook position and means normally constraining said two levers to engagement in closed hook position.

7. In a toggle linkage type hook device the combination of a pair of plate members of elongated character with spaced longitudinally disposed laterally offset ends adapted for operative abutment and connection together, one of said pair of abutting ends comprising a device anchorage and the other of said pair of abutting and connecting ends comprising a hook stationary jaw, a movable jaw member disposed between and pivotally supported by the plate members and juxtapositioned to the stationary jaw, a toggle type linkage having a pair of relatively fixed pivots and connected to the movable jaw member and disposed between and operatively pivoted by said plate members, means constraining said toggle type linkage in closed jaw position said plate members being spaced apart intermediate of the ends for linkage accommodation, flange means closing the space at one side of the plate members and a movable closure member for the spacing at the opposite side of said members.

8. A hook device as defined by claim 7 wherein said movable closure member comprises a linkage release means, said closure member when moved from closing position effecting linkage release for hook opening purposes.

9. A hook device as defined by claim 8 wherein spring means normally constrains said closure member to a position to close the spacing at the opposite side of said member.

10. In a hook structure a stationary jaw, a second jaw effectively L-shaped in outline, the two jaws having engagement when the hook is closed, a housing in which the second jaw is pivoted near one end and to one side thereof opposite the fixed jaw carried by said housing, a bell crank lever pivoted intermediate the housing ends and to one side of the stationary jaw and having a can portion and a tongue portion, a second bell crank lever pivoted in said housing remote from the second jaw and first lever pivotal axis and between the same oppositely disposed relative to the first lever and having a cam portion interfitting with the cam portion of the first lever and operable in said throat, link means connecting the second jaw and first lever together, and spring means normally constraining said levers and the movable jaw to hook closed position.

11. In a hook structure a stationary jaw, a second jaw effectively L-shaped in outline, the two jaws having engagement when the hook is closed, a housing in which the second jaw is pivoted near one end and to one side thereof opposite the fixed jaw, a bell crank lever pivoted intermediate the housing ends and to one side of the stationary jaw, a second bell crank lever pivoted in said housing remote from the second jaw and first lever pivotal axis and between the same, link means connecting the second jaw and first lever together, the two levers being oppositely disposed and having cam portions adapted to interfittingly engage with one another for dual cam timed association, and spring means normally constraining said levers and the movable jaw to hook closed position, the link means pivotal axis and the first lever pivotal axis being in alignment when the jaws are in closed hook position.

12. A hook device comprising in combination a base member including a stationary jaw, a movable jaw pivotally mounted on said base member and cooperatively associated with said stationary jaw, a rocker arm pivoted on said base member having one end connected through a link connection with the movable jaw and having an engageable holding face and a moving extension and an operating arm having an engaging portion and cooperatively engaging said holding face and a moving extension engaging portion and operable in one direction to engage said holding face engageable portion with holding face and move the rocking arm in a direction to effect closing of the jaws and in an opposite direction to release said holding face and release said extension to effect the opening of said jaws and means for biasing said rocker arm in a closed direction.

13. A hook device comprising in combination a base member including a stationary jaw, a movable jaw pivotally mounted on said base and cooperatively associated with said stationary jaw, a bell crank lever pivotally mounted on said base, a link pivotally connected at one end to the end of the movable jaw beyond its pivotal point and having its opposite end pivotally connected to one leg of said bell crank lever, and a second lever pivotally mounted on said base having an engaging nose engaging the end of one leg of said bell crank lever and hold the same in non-rocking position, and a camming portion cammingly engaging the other leg of said bell crank lever for effecting a rocking of said bell crank lever on its pivot, the movement of said lever to effect said rocking movement moving the holding nose thereof out of holding position and means for biasing said second lever in a holding position.

14. A hook device comprising in combination a base member including a stationary jaw, a movable jaw pivotally mounted on said base and cooperatively associated with said stationary jaw, a bell crank lever pivotally mounted on said base and having one leg link connected with said movable jaw beyond the pivot point of said jaw, the inner face of the legs of said bell crank lever being arcuately cammed, an operating lever pivotally mounted on said base member for said bell crank lever having a curved cammed surface cooperating with the arcuately cammed surface of the bell crank lever and when in one position engaging one leg of the bell crank lever to hold the same against rocking movement and when moved into another position engaging the other leg of the bell crank lever to rock the same on its pivot in a direction to release the movable jaw means for biasing said operating lever in holding position.

15. A hook device comprising in combination a base member including a stationary jaw, a movable jaw pivotally mounted on said base and cooperatively associated with said stationary jaw, a bell crank lever pivotally mounted on said base having one leg link connected with said movable jaw and one side of the pivotal point of said jaw, an operating lever engaging with the legs of said bell crank lever and when moving in one direction engaging one leg of said bell crank lever to move and hold said bell crank lever in lock-up position and when moved in the opposite direction engaging the other leg of the bell crank lever and moving the bell crank lever in the opposite direction to release the movable jaw member.

16. A hook device comprising in combination, a base member including a stationary jaw, a movable jaw mounted on said base and cooperatively associated with said stationary jaw, a bell crank lever pivotally mounted on said base, a link having one end connected to said movable jaw beyond its pivotal point and the opposite end pivotally connected to one leg of said bell crank lever, the pivotal centers of the bell crank lever and the pivotal connections between the link and the lever leg and the jaw being in alignment when the jaw is in closed position and an operating lever for said bell crank lever pivoted on said base which in one position engages and holds one leg of the bell crank lever in lock-up position and when moved to an opposite position engages the other leg to the bell crank lever and locks the lever to unlocked position.

FREDRICK W. COFFING.

REFERENCES CITED

The following references are of record in the file of this patent:

UNITED STATES PATENTS

| Number | Name | Date |
|---|---|---|
| 1,041,068 | Greenbolgh | Oct. 15, 1912 |
| 1,813,294 | Hunt | July 7, 1931 |
| 2,425,309 | Ennis | Aug. 12, 1947 |